United States Patent [19]

Stauers

[11] 4,234,881
[45] Nov. 18, 1980

[54] DYNAMIC DIGITAL TIME INTERVAL DISCRIMINATOR AND METHOD

[75] Inventor: Juris Stauers, Tempe, Ariz.

[73] Assignee: Motorola, Inc., Schaumburg, Ill.

[21] Appl. No.: 946,483

[22] Filed: Sep. 28, 1978

[51] Int. Cl.$^3$ .............................................. G01S 13/58
[52] U.S. Cl. .................................... 343/8; 343/5 DP; 368/118
[58] Field of Search ................. 343/5 DP, 8; 324/186

[56] References Cited

U.S. PATENT DOCUMENTS

| | | | |
|---|---|---|---|
| 3,537,003 | 10/1970 | Planta et al. ...................... | 324/186 X |
| 3,660,842 | 5/1972 | Ballantyne ..................... | 343/5 DP X |

*Primary Examiner*—T. H. Tubbesing
*Attorney, Agent, or Firm*—Eugene A. Parsons

[57] ABSTRACT

Circuitry for indicating the occurrence of a predetermined separation time between adjacent pairs of pulses in a sequence of pulses including a first counter having a first relatively high frequency clock signal applied thereto and the sequence of pulses applied to reset the counter for each pulse, a second counter having a relatively low frequency clock signal applied thereto with the second counter counting the total number of cycles from an initial or starting time, and comparators for comparing the number of cycles in the first counter to the number of cycles in the second counter and providing output signals when the comparison indicates that the separation time between adjacent pairs of pulses is within a predetermined range.

12 Claims, 4 Drawing Figures

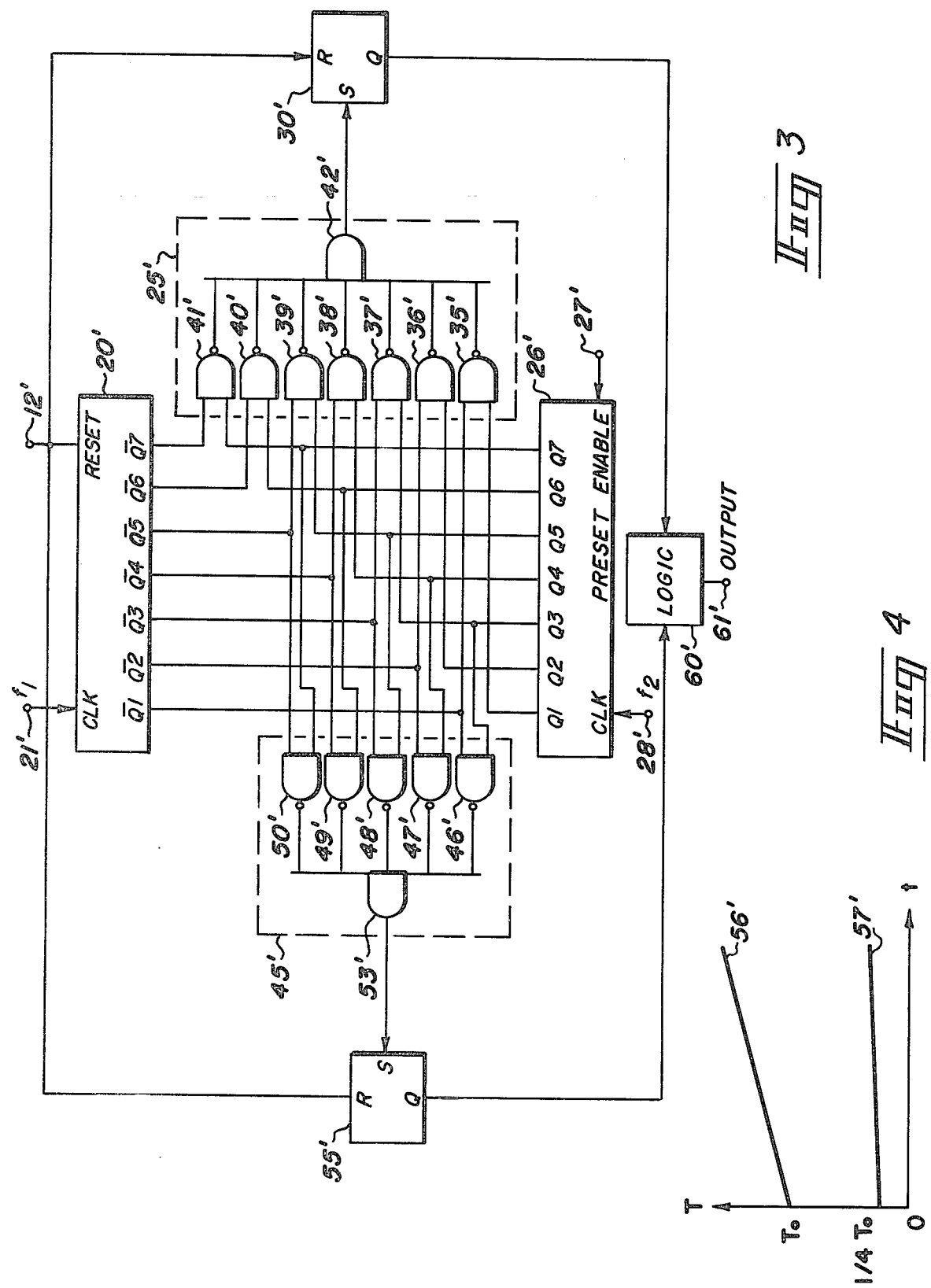

DYNAMIC DIGITAL TIME INTERVAL DISCRIMINATOR AND METHOD

BACKGROUND OF THE INVENTION

In many electronic applications wherein doppler radar and the like are utilized, the relative speed between the vehicle carrying the radar and an object of interest may be varying, such as when the vehicle carrying the radar passes close by the object of interest. In many applications it is desirable to provide an indication when the relative speed, or Doppler frequency shift, reaches a predetermined value. Also, it is desirable to have the ability to differentiate between signals returned from the object of interest and signals returned from, or emanating from, other objects. By knowing the approximate speed of the vehicle carrying the radar (including any alterations in the speed thereof) and the approximate speed of the object of interest, a general (or acceptable) range of approximate Doppler frequency shifts can be determined. Since this range of Doppler frequency shifts will be continually changing as the relative speed and relative position of the vehicle and object of interest changes, it is necessary to calculate, or chart, a continuously changing range of frequencies with time. When a return signal falls within the continuously changing range of frequencies, it is generally a return signal from the object of interest.

In the prior art, analog circuitry is generally utilized to provide a precalculated frequency pattern which may serve as an upper, or lower, limit for return signals. The analog circuitry is undesirable because it is extremely expensive and generally bulky.

SUMMARY OF THE INVENTION

The present invention pertains to a dynamic digital time interval discriminator for indicating the occurrence of a predetermined separation time between pairs of pulses in a sequence of pulses, which sequence is changing in repetition rate, wherein a first clock signal at a relatively high frequency is counted between adjacent pairs of pulses and a second clock signal with a relatively low frequency is counted from an initial time and the two counts are compared to determine whether they are approximately equal, thereby indicating that the predetermined separation time between pairs of pulses has occurred. The ratio of the frequencies of the first and second clock signals are selected to generally coincide with a frequency versus time chart for a selected Doppler radar, vehicle for carrying the radar and object of interest. A second comparison, which is spaced from the first comparison by a predetermined amount, may be utilized in conjunction with the first comparison to provide an acceptable range of approximate Doppler frequencies over a predetermined period of time.

It is an object of the present invention to provide a new and improved dynamic digital time interval discriminator for indicating the occurrence of a predetermined separation time between pairs of pulses in a sequence of pulses, which sequence is changing in repetition rate.

It is a further object of the present invention to provide a new and improved dynamic digital time interval discriminator for use with a Doppler radar wherein a vehicle carrying the radar and an object of interest to be scanned by the radar produce a varying chart of Doppler frequency shifts versus time.

It is a further object of the present invention to provide a method of indicating when the separation between adjacent pulses, in a sequence of pulses with a changing repetition rate, reaches a predetermined time period.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the Figures:

FIG. 3 is a slightly more detailed block diagram of another embodiment of a dynamic digital time interval discriminator; and FIG. 4 is a presentation of a typical plot of pulse separation as a function of time for the discriminator of FIG. 3.

DESCRIPTION OF THE PREFERRED EMBODIMENTS

Figure 1:
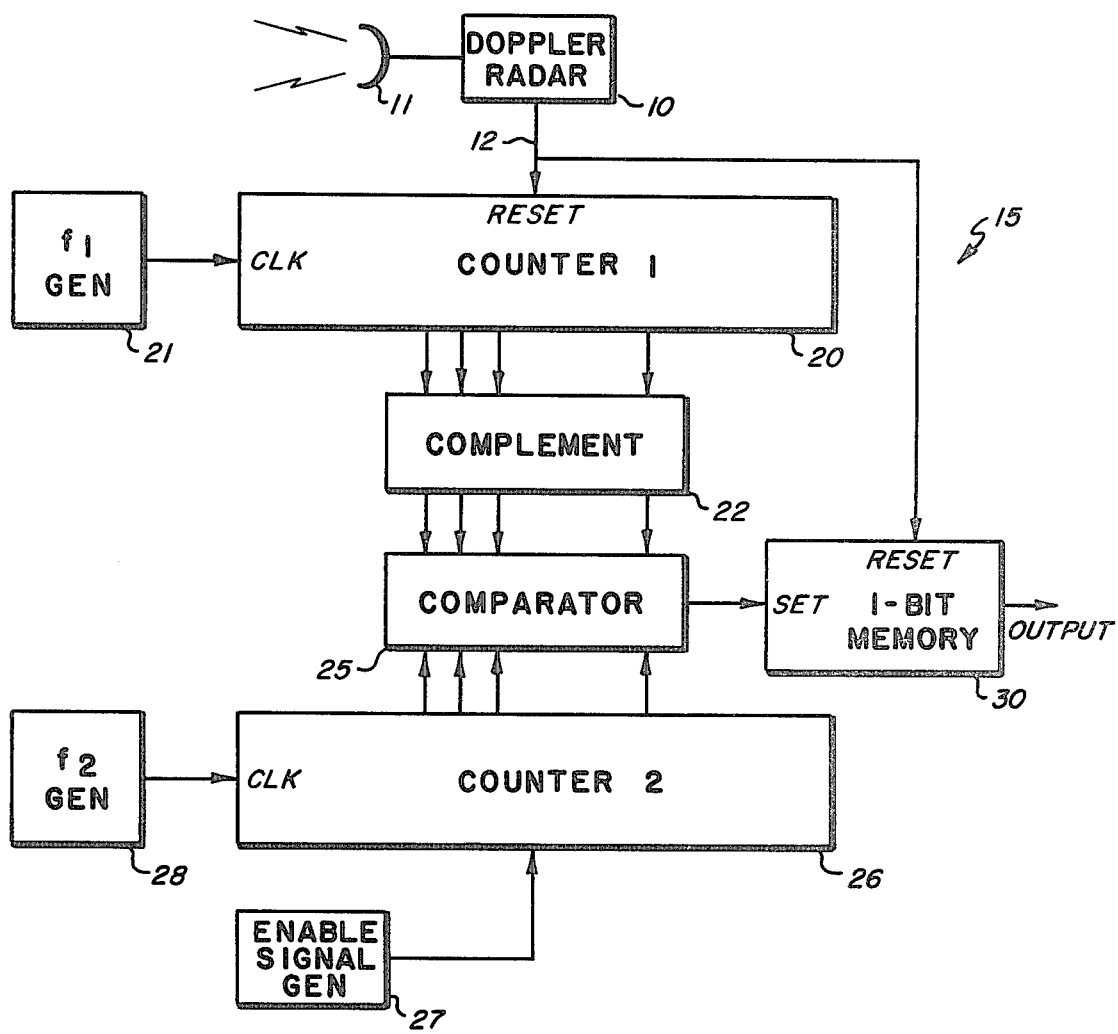
FIG. 1 is a block diagram of a dynamic digital time interval discriminator embodying the present invention and associated with a Doppler radar.

Referring specifically to FIG. 1, the number 10 designates a doppler radar having an antenna 11 for transmission and reception of signals and a Doppler frequency output 12 having a signal thereon in the form of a sequence of pulses. The output 12 of the Doppler radar 10 is connected to a dynamic digital time interval discriminator generally designated 15 as will be described presently. While the discriminator 15 is illustrated in conjunction with the Doppler radar 10, it should be understood that many other applications may be devised by those skilled in the art and all such applications are intended to come within the scope of this invention.

The output 12 of the Doppler radar 10 is connected to a reset input of a first counter 20. A clock input of the counter 20 receives a clock signal from a first frequency source, which is herein illustrated as $f_1$ generator designated 21. The counter 20 has a plurality of outputs connected through a complement device 22 (for adaption of the specific equipment utilized) to a plurality of inputs of a comparator 25. A second counter 26 has an enabling means, herein illustrated as an enable signal generator 27, connected to an enable or initialize input designed to receive a pulse for starting the counter 26. A clock input of the counter 26 is connected to receive a clock signal at a second frequency, which is herein provided by a source illustrated as $f_2$ generator designated 28. The counter 26 also has a plurality of outputs, which are connected to a plurality of inputs of the comparator 25. A single output of the comparator 25 is connected to output means, which in this embodiment is a one bit memory 30. The memory 30 has a reset input connected to the output 12 of the Doppler radar 10 and the output from the comparator 25 is connected to a set input. An output of the memory 30 is adapted to be connected to further apparatus for the utilization of the memory output, which is not illustrated here for convenience.

In the operation of the discriminator illustrated in FIG. 1, the enable signal generator 27 provides a pulse to the counter 26 which then begins to count pulses or cycles from the generator 28 and the counter 20 counts pulses from the generator 21. At some subsequent time, the Doppler radar 10 will begin to supply a Doppler frequency signal at the output 12. The Doppler frequency signal will be a sequence of pulses and the repetition rate of the pulses will vary in accordance with the relative speed and position of the vehicle carrying the Doppler radar 10 and the object of interest illuminated thereby. Each pulse in the sequence of pulses supplied to the reset input of the counter 20 will reset the counter 20 and, after each pulse, the counter 20 will begin again to count the cycles or pulses supplied to the clock input from the generator 21. The frequency of the generator 21 is relatively high compared to the frequency of the generator 28 and the Doppler frequency signal at the output 12. The counter 26 is preset to some initial count and, when activated by the enable pulse, will start with the initial count. Also, the counter 26 counts continuously from the time the enable pulse is applied thereto from the generator 27. The count in the counter 20 will be the number of pulses at the frequency of the generator 21 between adjacent pulses at the output 12 of the Doppler radar 10. As these Doppler pulses vary in repetition rate, for example as the Doppler frequency goes down and the time between the pulses gets longer, the count in counter 20 will go up. When the count in counter 20 compares to the count in counter 26, in accordance with the connections to the comparator 25, a pulse is applied to the set input of the one bit memory 30. Since the output 12 of the Doppler radar 10 is connected to the reset input of the memory 30, the memory 30 is reset for each Doppler pulse and the number of pulses from the generator 21 between adjacent Doppler pulses must be equal to the total count in the counter 26 before the memory 30 will supply an output.

Let $N_1$ equal the count in counter 20, $N_2$ equal the count in counter 26, T equal the time between adjacent pulses at the output 12 of the Doppler radar 10, and t equal elapsed time from the occurrence of the enable pulse (start of the discriminator).

$$N_1 = f_1 T$$

$$N_2 = f_2 t + N_{2(INT)}$$

When $$N_1 = N_2$$

$$f_1 T = f_2 t + N_{2(INT)}$$

at time zero, with $N_1$ equal to $N_2$ (the condition required to set the memory 30), the following is true:

$$t = 0$$

$$T = T_o$$

$$f_1 T_o = N_{2(INT)}$$

$$T_o = [N_{2(INT)}]/f_1$$

at any other time with $N_1$ equal to $N_2$ $$T = (f_2/f_1)t + [N_{2(INT)}]/f_1$$

$$T = (f_2/f_1)t + T_o$$

Figure 2:
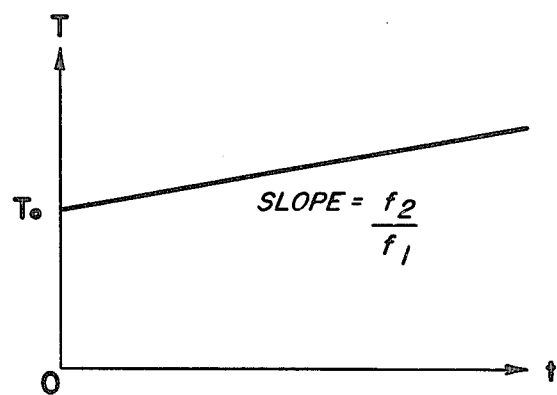
FIG. 2 is a presentation of a typical plot of pulse separation as a function of time for the discriminator of FIG. 1.

Referring to FIG. 2, a plot of the spacing between Doppler pulses, T, at which $N_1$ equals $N_2$ is shown as a function of time. The amount that $T_o$ is offset or separated from zero is determined by the initial setting, $N_{2(INT)}$, entered in the counter 26. From the above equations, it can be seen that the slope of the line, or plot, is equal to $f_2/f_1$. Thus, by knowing the approximate relative speed of the vehicle carrying the radar 10 and the object of interest, the frequencies $f_2$ and $f_1$ can be selected so that the plot of T at which $N_1$ equals $N_2$ approximately coincides with a plot of the Doppler frequencies returned from the object of interest. Thus, an output from the discriminator 15 indicates that the Doppler signal at the output 12 of the radar 10 is a return from the object of interest.

Referring specifically to FIG. 3, a second embodiment of a dynamic digital time interval discriminator is illustrated wherein components similar to those in FIG. 1 are designated with the same number and a prime is added to all of the numbers to indicate a second embodiment. In this embodiment, a first counter 20' is adapted to receive Doppler frequency pulses at a reset input from an output (terminal) 12' and clock pulses at a first frequency $f_1$ from a source (not shown) at a terminal 21'. A second counter 26' is adapted to receive an enable pulse from a source (not shown) on a terminal 27' and clock pulses at a frequency $f_2$ from a source (not shown) on a terminal 28'. A comparator 25' is illustrated as a plurality of NAND gates 35' through 41' each having a pair of inputs and an output connected to inputs of an AND gate 42'. The output of the AND gate 42' is the output of the comparator 25' and is connected to the set input of a one bit memory 30'. The counter 20' has a plurality of outputs, each being connected to one input of the NAND gates 35' through 41', respectively. Similarly, the counter 26' has a plurality of outputs each of which is connected to a second input of the NAND gates 35' through 41', respectively. Thus, when the count in counter 20' equals the count in counter 26' a set signal is applied to the memory 30' and a signal appears at the output thereof.

In the present embodiment a second comparator 45', including five NAND gates 46' through 50' and a summing AND gate 53', is connected to the counters 20' and 26' as follows. In the present embodiment both counters 20' and 26' have seven outputs. The first five outputs ($Q_1$ through $Q_5$) of the counter 20' are connected to first inputs of the NAND gates 46' through 50', respectively. The last five outputs ($Q_3$ through $Q_7$) of the counter 26' are connected to second inputs of the NAND gates 46' through 50', respectively. Thus, the comparator 45' will provide an output signal for ¼ the number of counts needed to get an output from 25'. This means that a plot of T, as shown in FIG. 4, for the comparators 25' and 45' is two straight lines 56' and 57' with the upper line 56' representing $N_1 = N_2$ for the comparator 25' and the lower line 57' representing $N_1 = N_2$ for the comparator 45'. Because of the differences in the connections to the counters 20' and 26' the initial starting point, ¼$T_o$, for the line 57' is one-fourth of the starting point, $T_o$, for the line 56' and the slope of the line 57' is only $f_2/4/f_1$. By selecting the frequencies $f_1$ and $f_2$ so that the plot of T for the comparator 25' is slightly less than a plot of the expected T for the Doppler frequency return from an object of interest and the plot of the T for the comparator 45' is slightly greater or earlier in time than the expected T, a range of Doppler frequencies as a function of time is defined which contains the expected Doppler frequency return from the object of interest. Thus, any Doppler return which appears within the defined range should be a radar return signal from the object of interest.

The output from the comparator 45' is applied to a set input of a one bit memory 55'. A reset input of the memory 55' is connected to the terminal 12' to receive Doppler frequency pulses thereon. An output of the memory 55' is applied to one input of a logic circuit 60' and a second input of the logic circuit 60' is connected to the output of the memory 30'. The logic circuit 60' is not illustrated in detail since those skilled in the art could devise a variety of circuits which would provide the desired function. The comparators 25' and 45' are designed to provide an output signal when all of the input signals are equal, so that an output signal is supplied by each of the memories 30' and 55' when the count in the counter 20' is equal to the count in the counter 26' at any time during the period T. The logic circuit 60' then receives the outputs from the memories 30' and 55' and provides an output at a terminal 61' when the count in the counter 20' is greater than or equal to the amount required to produce an output from the comparator 45' and equal to or less than the amount required to produce an output from the comparator 25'. This range of frequencies and the slopes of the plots can be changed by altering the connections to the comparators 25' and 45'. While the embodiment of FIG. 3 illustrates two different comparators for providing the range of acceptable frequencies, it should be understood that those skilled in the art may devise other apparatus for producing or providing the range as, for example, by providing different apparatus for producing the separation between plots.

In a typical example of the structure illustrated in FIG. 3, suppose that at a time t=1 sec, the range of acceptable Doppler frequencies retained from an object of interest is 25 kHz to 100 kHz. By selecting $f_1=1$ mHz, $f_2=10$ Hz, N initial=30, the circuit as illustrated would discriminate between frequencies in the acceptable range, 25 kHz to 100 kHz, and any other frequencies that might be presented. Further, at t=5 sec., the same circuit with parameters as described above, would discern as acceptable frequencies resulting from an object of interest in the range of 12.5 kHz to 50 kHz.

Thus, two embodiments of a dynamic digital time interval discriminator and a method have been disclosed, which discriminators and method are capable of indicating the occurrence of a predetermined separation time between pairs of pulses in a sequence of pulses, which sequence is changing in repetition rate. A digital discriminator is disclosed because of the simplicity and ease of manufacture. Further, the entire structure can be incorporated into an IC circuit and can be easily and quickly modified to alter the range of acceptable frequencies, as well as the range as a function of time. While I have shown and described specific embodiments of this invention, further modifications and improvements will occur to those skilled in the art. I desire it to be understood, therefore, that this invention is not limited to the particular forms shown and I intend in the appended claims to cover all modifications which do not depart from the spirit and scope of this invention.

What is claimed is:

1. A dynamic digital time interval discriminator for indicating the occurrence of a predetermined separation time between pairs of pulses in a sequence of pulses, which sequence is changing in repetition rate, the discriminator comprising:
   (a) first counting means having a clock input terminal adapted to receive a first clock signal at a first predetermined frequency, said first counting means having a reset input terminal adapted to receive the sequence of pulses thereon and a plurality of output terminals;
   (b) second counting means having a clock input terminal adapted to receive a second clock signal at a second predetermined frequency substantially different than said first predetermined frequency, said second counting means having an enable input terminal adapted to receive an enable signal thereon and a plurality of output terminals;
   (c) comparator means having a first plurality of input terminals coupled to the output terminals of said first counting means, a second plurality of input terminals coupled to the output terminals of said second counting means, and an output terminal for comparing signals at the outputs of said first and second counting means and providing an output signal when the signals compare; and
   (d) output means having an input terminal coupled to the output terminal of said comparator means, a reset terminal coupled to the reset terminal of said first counting means, and an output for providing a signal indicative of the occurrence of the predetermined time.

2. A dynamic digital time interval discriminator as claimed in claim 1 including in addition first and second clock signal generating means connected to the clock input terminals of the first and second counting means, respectively.

3. A dynamic digital time interval discriminator as claimed in claim 1 wherein the output means is a one bit memory.

4. A dynamic digital time interval discriminator as claimed in claim 1 including in addition Doppler radar means connected to the reset input terminal of the first counting means for providing a sequence of Doppler pulses thereto.

5. A dynamic digital time interval discriminator for indicating the occurrence of a predetermined separation time between pairs of pulses in a sequence of pulses, which sequence is decreasing in repetition rate, the discriminator comprising:
   (a) first counting means having a clock input terminal, a reset input terminal and a plurality of output terminals;
   (b) second counting means having a clock input terminal, an enable signal input terminal and a plurality of output terminals;
   (c) Doppler radar means having an output connected to the reset input of said first counting means for providing a sequence of Doppler pulses thereon;
   (d) first signal generating means connected to the clock input terminal of said first counting means for providing a first clock signal at a first predetermined frequency relatively high compared to the sequence of Doppler pulses;
   (e) second signal generating means connected to the clock input terminal of said second counting means for providing a second clock signal at a second predetermined frequency substantially lower than said first predetermined frequency;

(f) enable signal generating means connected to the enable signal input terminal of said second counting means for supplying an enable signal thereto;

(g) comparator means having a first plurality of input terminals connected to the output terminals of said first counting means, a second plurality of input terminals connected to the output terminals of said second counting means, and an output terminal for comparing signals at the outputs of said first and second counting means and providing an output signal when the signals compare; and (h) output means having an input terminal connected to the output terminal of said comparator means, a reset terminal coupled to the reset terminal of said first counting means, and an output for providing a signal indicative of the occurrence of the predetermined time.

6. A dynamic digital time interval discriminator as claimed in claim 5 wherein the first and second predetermined frequencies are selected so that the number of cycles of the first predetermined frequency counted by the first counting means during the predetermined time must be at least equal to the total number of cycles of the second predetermined frequency counted by the second counting means between the application of an enable signal thereto and the end of the predetermined time.

7. A dynamic digital time interval discriminator as claimed in claim 5 including in addition second comparator means having a first plurality of input terminals connected to at least some of the output terminals of the first counting means, a second plurality of input terminals counnected to at least some of the output terminals of the second counting means, and an output terminal for comparing signals at the connected outputs of said first and second counting means and providing an output signal when the signals compare, second output means having an input terminal connected to the output terminal of said second comparator means, a reset terminal coupled to the reset terminal of said first counting means, and an output for providing a signal indicative of the occurrence of a second predetermined time, and logic means having two inputs connected to the outputs of the two output means, respectively, and providing an output signal in response to output signals from said output means.

8. A dynamic digital time interval discriminator as claimed in claim 7 wherein the predetermined time of the first comparator means and its associated output means is longer than the second pedetermined time of the second comparator means and its associated second output means, and the logic means is constructed to provide an output signal whenever a pair of pulses in the sequence of pulses are separated by a period of time between the first predetermined time and the second predetermined time.

9. In a sequence of pulses, which sequence is decreasing in repetition rate, a method of indicating when the separation between adjacent pulses reaches a predetermined time period, said method comprising the steps of:

(a) providing a first signal at a frequency much higher than the repetition rate of the sequence of pulses;

(b) providing a second signal at a frequency much lower than the frequency of the first signal;

(c) counting the number of cycles in the first signal between each adjacent pair of pulses in the sequence;

(d) counting the total number of cycles in the second signal from an initial time; and (e) comparing the counts to each other, each pulse of the sequence, and providing an output signal when the counts are substantially equal.

10. A method as claimed in claim 9 including in addition the step of selecting the frequencies of the first and second signals so that the ratio of the total number of cycles of the second signal to the number of cycles of the first signal between adjacent pulses follows a preselected pattern.

11. A method as claimed in claim 9 for indicating when the separation between adjacent pulses reaches a second, different, predetermined time period including in addition the step of further comparing portions of the counts to each other, each pulse of the sequence, and providing a second output signal when the portions are substantially equal.

12. A method as claimed in claim 11 including in addition the step of monitoring the output signals of the two comparing steps to determine when the separation between two adjacent pulses occurs generally between the two predetermined time periods.

* * * * *